United States Patent [19]
Hallouis

[11] Patent Number: 5,987,926
[45] Date of Patent: Nov. 23, 1999

[54] MOLD MADE OF CUPROALUMINUM ALLOY FOR THE MANUFACTURE OF GLASS PRODUCTS

[75] Inventor: Martine Hallouis, Nancy, France

[73] Assignee: Saint-Gobain Emballage, Courbevoie, France

[21] Appl. No.: 09/084,204

[22] Filed: May 26, 1998

[30] Foreign Application Priority Data

May 23, 1997 [FR] France .................................... 97 06293

[51] Int. Cl.⁶ .............................. C03B 13/16; B28B 7/34
[52] U.S. Cl. ........................................ 65/374.12; 249/135
[58] Field of Search ........................ 65/374.12; 420/471, 420/479, 481; 148/433, 434, 435; 425/175, 472; 249/135

[56] References Cited

U.S. PATENT DOCUMENTS

| | | | |
|---|---|---|---|
| 4,732,602 | 3/1988 | Dakan et al. ......................... | 65/374.12 |
| 5,656,104 | 8/1997 | Imamura et al. ....................... | 148/325 |

FOREIGN PATENT DOCUMENTS

| | | |
|---|---|---|
| 383998 | 8/1990 | European Pat. Off. . |
| 49-122420 | 11/1974 | Japan . |
| 7-310133 | 11/1995 | Japan . |
| 8-165532 | 6/1996 | Japan . |
| 8-311634 | 11/1996 | Japan . |
| 2157315 | 10/1985 | United Kingdom . |

*Primary Examiner*—Sean Vincent
*Attorney, Agent, or Firm*—Oblon, Spivak, McClelland, Maier & Neustadt, P.C.

[57] ABSTRACT

A mold for the manufacture of glass products at least a portion of which consists of a cuproaluminum alloy that contains: 0.02% wt. or more of one or several elements chosen from among Sc, Sr, Y, Zr and Hf, and/or from 0.02% wt. or more of one or several lanthanides. The cuproaluminum alloy is one of a composition comprising 5 to 15% wt. Al, 2 to 7% wt. Ni, 2 to 7% wt. Fe, 0.05 to 1.5% wt. Si, 0.02% to 2% wt. Mn, and at most 0.25% wt. Zn, with the remainder comprising Cu; or a composition comprising 12 to 18% wt. Ni, 1% wt. or less Fe, 0.05 to 1.5% wt. Si, 0.5% to 2% wt. Mn, and 6 to 12% wt. Zn, with the remainder comprising Cu.

18 Claims, No Drawings

MOLD MADE OF CUPROALUMINUM ALLOY FOR THE MANUFACTURE OF GLASS PRODUCTS

BACKGROUND OF THE INVENTION

1. Field of the Invention

This invention relates to molds for the manufacture of glass products, for example bottles.

2. Description of the Related Art

The manufacture of glass products is preferably carried out in two main stages: In the initial stage, the glass gob, preferably heated to a temperature of approximately 1100° C. is placed in contact with a mold. The mold preferably comprises a rough-forming mold that has connected at its lower portion a ring mold. The portion of the gob in contact with the ring mold is preferably cooled to a point where the glass has almost solidified into its final shape as the neck of the glass product. The remaining portion of the gob is preferably kept at a high enough temperature to permit the further shaping and sculpting of this part of the glass product.

The different temperatures of the glass gob in the rough-forming mold and the ring mold are preferably produced by external cooling means, including the blowing of ventilated air on the sides of the ring mold. Different temperatures in the two molds are also preferably produced by the use of different materials for the ring mold and for the rough-forming mold. In this process, the material used to make the ring mold preferably possesses a higher thermal conductivity (or diffusivity), than the material used to make the rough-forming mold. As a result, heat is transferred away from the gob more rapidly in the ring mold than in the rough-forming mold and the temperature of the portion of the gob in the ring mold is lower than the gob temperature in the rough-forming mold.

After the glass gob is shaped in the rough-forming mold, it is preferably placed in a finishing mold. Finishing molds have to absorb a greater quantity of heat than the rough-forming molds, because the glass products in these molds generally drop to temperatures below the solidification temperature of glass.

Conventional methods for making the molds described above preferably include casting the molds. Unfortunately, the casting methods used produce molds that have coarse surfaces and that frequently crack due to thermal fatigue.

Bronze is an alloy that is preferably used in the molds and is very prone to corrosion and oxidation. In contrast, marine bronze produces molds with a very fine surface structure, good resistance to corrosion, and good resistance to cracking due to thermal fatigue. Marine bronze is preferably made from approximately 9–10% wt. Al, 4–5% wt. Fe, 4–5% wt. Ni, and the balance comprising Cu and customary impurities.

The manufacture of glass products as described above requires high temperatures, preferably 900–1300° C., more preferably 1000–1200° C., even more preferably 1050–1150° C., and rapidly alternating thermal cycles, preferably 10 cycles/minute. Under these conditions, even molds made from marine bronze undergo a surface oxidation that forms pits and blemishes on the surface of the mold.

The erosion of the mold surface is further accelerated in a preferred glass manufacturing method that involves coating the surface of the mold with grease prior to contact with the glass gob: In this method, the grease forms graphite deposits on the oxidized portions of the mold at high temperatures. The graphite deposits accelerate the wearing away of the surface of the mold.

SUMMARY OF THE INVENTION

Accordingly, one object of this invention is to provide molds for making glass products that have good resistance to surface oxidation. Another object of the invention provides for molds that have long lifetimes while also having a fineness of surface appearance and resistance to cracking due to thermal fatigue similar to molds made of marine bronze.

These and other objects of the present invention have been satisfied by a mold for the manufacture of glass products, preferably bottles, that in part or in whole is preferably made from a cuproaluminum alloy.

DETAILED DESCRIPTION OF THE PREFERRED EMBODIMENTS

In the present invention, a cuproaluminum alloy is preferably used in part of, and more preferably used for the entire mold. The cuproaluminum alloy preferably comprises:

preferably 0.02% or more, more preferably 0.02–1.0% of one or several elements selected from the group consisting of Sc, Sr, Y, Zr and Hf, and/or preferably 0.02% or more, more preferably 0.02–2.0% of one or more lanthanides.

In a first preferred embodiment of the present invention, the molds preferably comprise 0.1–0.5% Y, and preferably 0.01–0.8% of one or more lanthanides. In this first preferred embodiment, the lanthanides preferably include:

0.05–0.7% Ce, 0.04–0.4% La, 0.22–0.4% Nd, and 0.005–0.05% Pr.

In a second preferred embodiment, the content of the alloy that preferably comprises at least a portion of the mold is:

5–15% Al,

2–7% Ni,

2–7% Fe, 0.05–1.5% or, more preferably, 0.2–0.8% Si, 0.02–2% or, more preferably, 0.6–1.4% Mn, 0.25% or less Zn, and the remainder consisting essentially of Cu and customary impurities.

In this second preferred embodiment, the most preferred amounts of Al, Ni and Fe are:

8–11% Al, 3.5–5.5% Ni, and 3.5–5.5% Fe.

In a third preferred embodiment, the content of the alloy that preferably comprises at least a portion of the mold is:

5–15% Al,

12–18% Ni,

1% or less Fe, 0.05–1.5% or, more preferably, 0.2–0.8% Si, 0.02–2% or, more preferably, 0.6–1.4% Mn, 6–12% Zn, and the remainder consisting essentially of Cu and customary impurities.

In this third preferred embodiment, the most preferred amounts of Al, Ni, Fe, and Zn are:

8–11% Al,

14–16% Ni, at most 1% Fe, and

8–10% Zn.

It should be noted that the thermal conductivity and diffusivity of the alloys of the invention are relatively high, in particular with respect to the casting customarily used. This makes the alloys of the present invention particularly preferred materials for ring molds and finishing molds, most preferably the casings and the bottom of the finishing molds.

Rough-forming molds (casings, bottom) are preferably made from the alloys of the present invention. Glass in rough forming molds made from alloys of the present invention cools more quickly than glass in rough forming molds made from conventional alloys. As a result, glass products that are being formed in rough-forming molds that are made from alloys of the present invention preferably require a shorter period of time in the mold to prevent the glass from solidifying.

When rough-forming molds are made from the alloys of the present invention, the time needed to transfer the glass from the rough-forming mold to the finishing mold is preferably shorter. In order to compensate for the shorter amount of time that the glass spends in the rough-forming mold, the finishing mold is preferably made from materials with higher thermal conductivity than those used in the rough-forming mold. Alternatively, preferably two finishing molds are used with the rough-forming mold.

With respect to the process for preparation of the molds of the invention, the inventors noted that a casting on a cooler advantageously resulted in a fine structure with the best resistance to thermal cycles and ensuring the health of the metal. Thus, the most preferred method of making the molds of the present invention is by casting on a cooler. Making the molds of the present invention by sand casting, with or without a cooler and continuous casting is also preferred.

Surprisingly, graphite deposits that form on the surface of the molds of the present invention are only weakly bound and are easily removed under gentle cleaning conditions. Once the graphite deposits are eliminated, fewer pits, rough areas and surface irregularities are formed on the molds, compared to molds made from conventional materials. The pits, rough areas and surface irregularities are also smaller in size than similar molds made from conventional materials. Moreover, the inner surfaces of molds made from alloys of the present invention undergo far less erosion under identical cleaning conditions than molds made from conventional alloys.

The inventors established that there is at least a 30% increase in the lifespan of the molds made from the alloys of the present invention during bottle manufacturing.

Moreover, the buildup of graphite deposits is slower for the molds of the present invention, and they need to be cleaned with less frequency than conventional molds. In summary, the molds made of the alloys of the present invention have longer lifespans and require less cleaning than conventional molds for making glass products.

EXAMPLE

Having generally described this invention, a further understanding can be obtained by reference to certain specific examples that are provided herein for purposes of illustration only and not intended to be limiting unless otherwise specified. All percentages are by weight, unless stated otherwise.

The following table lists alloy compositions of the present invention. The elements contained in low proportions as customary impurities are not indicated. The numerical values for the listed elements have the units of weight percent of the total alloy composition.

| Alloy No. | 1 | 2 | 3 | 4 | 5 | 6 | 7 | 8 |
|---|---|---|---|---|---|---|---|---|
| Al | 8–10 | 8–10 | 8–10 | 8–10 | 8–10 | 8–10 | 8–10 | 8–10 |
| Ni | 3.5–5.5 | 14–16 | 14–16 | 3.5–5.5 | 3.5–5.5 | 3.5–5.5 | 3.5–5.5 | 3.5–5.5 |
| Zn | <0.25 | 8–10 | <0.25 | <0.25 | <0.25 | <0.25 | <0.25 | <0.25 |
| Fe | 3.5–5.5 | <1 | <1 | 3.5–5.5 | 3.5–5.5 | 3.5–5.5 | 3.5–5.5 | 3.5–5.5 |
| Si | 0.3–0.7 | <0.2 | <0.2 | 0.3–0.7 | 0.3–0.7 | 0.07–0.13 | 0.7–1.3 | 0.3–0.7 |
| Y | 0.2–0.4 | 0.15–0.25 | 0.2–0.4 | 0.05–0.15 | 0.15–0.25 | 0.2–0.4 | 0.2–0.4 | — |
| Mn | 0.5–1.5 | <1 | <1 | 0.5–1.5 | 0–1.5 | 0.5–1.5 | 0.5–1.5 | 0.5–1.5 |
| Ce | — | — | — | — | — | — | — | 0.2–0.5 |
| La | — | — | — | — | — | — | — | 0.1–0.2 |
| Nd | — | — | — | — | — | — | — | 0.05–0.15 |
| Pr | — | — | — | — | — | — | — | 0.01–0.02 |
| Cu | remainder | remainder | remainder | remainder | remainder | remainder | remainder | remainder |

Small plates were made from each of these eight alloys and subjected to corrosion tests for 24 hours at 500° C. in different atmospheres:

a) an atmosphere that contained 200 ppm of HCl, and b) an atmosphere that contained 1500 ppm of $SO_2$.

Comparison of alloys 1, 4 and 5 showed that an average Y content of 0.3% translated into less corrosion.

Comparison of alloys 1, 6 and 7 showed that an average Si content of 0.5% was preferable.

Finishing molds were made from alloys 1, 3 and 8 and a ring mold was made from alloy 2.

Under the customary conditions for manufacture of bottles, the molds showed greater resistance to corrosion, and their lifespans were all increased by at least 30%.

The present application is based on German Priority Application FR 97/06293, filed with the French Patent Office on May 23, 1997, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

I claim:

1. A mold, at least a portion of which comprises:

at least 0.02% wt. of one or more elements selected from the group consisting of Sc, Sr, Y, Zr and Hf, and/or at least 0.02% wt. of at least one lanthanide, wherein said mold comprises:

5 to 15% wt. Al, 2 to 7% wt. Ni, 2 to 7% wt. Fe,
0.05 to 1.5% wt. Si,
0.02% to 2% wt. Mn, and
at most 0.25% wt. Zn,
with the remainder comprising Cu.

2. The mold according to claim 1, wherein said mold comprises:
0.02 to 1.0% wt. of one or more elements selected from the group consisting of Sc, Sr, Y, Zr and Hf, and/or
0.02 to 2.0% of one or several lanthanides.

3. The mold according to claim 1, wherein said mold comprises:
0.1 to 0.5% wt. Y.

4. The mold according to claim 2, wherein said mold comprises:
0.1 to 0.5% wt. Y.

5. The mold according to claim 1, wherein said mold comprises:
0.01 to 0.8% wt. of at least one lanthanide.

6. The mold according to claim 5, wherein said mold comprises:
0.05 to 0.7% wt. Ce,
0.04 to 0.4% wt. La,
0.02% to 0.4% wt. Nd, and
0.005 to 0.05% wt. Pr.

7. The mold according to claim 1, wherein said mold comprises:
0.2 to 0.8% wt. Si.

8. The mold according to claim 1, wherein said mold comprises:
0.6 to 1.4% wt. Mn.

9. The mold according to claim 1, wherein said mold comprises:
8 to 11% wt. Al,
3.5 to 5.5% wt. Ni, and
3.5 to 5.5% wt. Fe.

10. The mold according to claim 1, wherein said mold is prepared by casting on a cooler.

11. The mold according to claim 1, wherein said mold is a rough-forming mold, a finishing mold, or a ring mold.

12. A mold, at least a portion of which comprises:
at least 0.02% wt. of one or more elements selected from the group consisting of Sc, Sr, Y, Zr and Hf, and/or
at least 0.02% wt. of at least one lanthanide,
wherein said mold comprises:
5 to 15% wt. Al,
12 to 18% wt. Ni,
1% wt. or less Fe,
0.05 to 1.5% wt. Si,
0.5% to 2% wt. Mn, and
6 to 12% wt. Zn,
with the remainder comprising Cu.

13. The mold according to claim 12, wherein said mold comprises:
0.2 to 0.8% wt. Si.

14. The mold according to claim 12, wherein said mold comprises:
0.6 to 1.4% wt. Mn.

15. The mold according to claim 12, wherein said mold comprises:
8 to 11% wt. Al,
14 to 16% wt. Ni, and
1% wt. or less Fe.

16. The mold according to claim 15, wherein said mold comprises:
8 to 10% wt. Zn.

17. The mold according to claim 12, wherein said mold is prepared by casting on a cooler.

18. The mold according to claim 12, wherein said mold is a rough-forming mold, a finishing mold, or a ring mold.

* * * * *